United States Patent [19]

Yousif

[11] Patent Number: 4,917,949

[45] Date of Patent: Apr. 17, 1990

[54] LEAKPROOFING CAP LINERS AND TAMPERPROOFING CONTAINERS BY INDUCTION HEATING

[76] Inventor: Bahjat Z. Yousif, 582 Washington St., Elmhurst, Ill. 60126

[21] Appl. No.: 181,561

[22] Filed: Apr. 14, 1988

Related U.S. Application Data

[63] Continuation-in-part of Ser. No. 6,913, Jan. 27, 1987, abandoned.

[51] Int. Cl.[4] .................. B32B 27/04; C01J 7/02; B65B 7/00
[52] U.S. Cl. .................... 428/349; 428/394; 428/416; 428/425.1; 428/425.8; 428/408; 423/809; 156/69; 206/807; 215/232
[58] Field of Search .......... 428/344, 345, 349, 354, 428/416, 425.1, 425.8, 468, 40; 425/809; 156/69, 348; 206/807; 215/232

[56] References Cited

U.S. PATENT DOCUMENTS

| | | | |
|---|---|---|---|
| 4,199,646 | 8/1980 | Hori et al. | 428/344 |
| 4,288,493 | 9/1981 | Kropp | 428/344 |
| 4,503,123 | 3/1985 | Ou-Yong | 428/345 |
| 4,522,870 | 6/1985 | Esmay | 428/345 |
| 4,599,265 | 7/1986 | Esmay | 428/344 |
| 4,684,554 | 8/1987 | Ou-Yong | 428/349 |

Primary Examiner—George F. Lesmes
Assistant Examiner—M. A. Katz
Attorney, Agent, or Firm—Mason, Kolehmainen, Rathburn & Wyss

[57] ABSTRACT

A laminated cap liner that, when subjected to an induction heating cap sealing process, can simultaneously release a container sealing material, such as aluminum foil, for adhering to a container and render the cap leak-resistant through the polymerization of a settable and/or a crosslinkable adhesive composition, such as an adhesive composition including a crosslinkable ethylene-vinyl chloride copolymer, that releasably secures the container sealing material to a pulpboard backing.

29 Claims, 1 Drawing Sheet

LEAKPROOFING CAP LINERS AND TAMPERPROOFING CONTAINERS BY INDUCTION HEATING

CROSS REFERENCE TO RELATED APPLICATIONS

This application is a continuation-in-part application of applicant's application Ser. No. 006,913, filed Jan. 27, 1987, now abandoned.

FIELD OF THE INVENTION

The present invention relates to a laminated cap liner that can be subjected to induction heating cap sealing techniques to simultaneously seal a container with a container sealing material and render the cap and cap liner leak-resistant to the contents of the container. More particularly, the laminated cap liner comprises a pulpboard backing and a container sealing material, such as aluminum foil, that are secured by a settable and/or a crosslinkable adhesive composition, such as a crosslinkable adhesive including a crosslinkable ethylene-vinyl chloride copolymer. During the induction heating cap sealing process, the settable and/or crosslinkable adhesive composition sets and/or crosslinks, thereby losing its adhesive properties and releasing the container sealing material for bonding to the container and, in addition, forms a continuous liquid-impervious polymeric film over the absorbent pulpboard backing to make the cap liner leak-resistant to the contents of the container after removal of the container sealing material from the container.

BACKGROUND OF THE INVENTION AND PRIOR ART

For several years a variety of products packaged in bottles or jars having screw-on lids or caps have been provided with an additional inner container sealing material to protect the container contents if the cap or lid is removed. This inner container sealing material is approximately the same diameter as the outer diameter of the container mouth and is adhered to the lip of the container by means of an adhesive. Furthermore, the inner container sealing material usually cannot be removed from the container without evidence of tampering. Additionally, the inner container sealing material prevents air, moisture, and/or other contaminants from contacting the contents of the unopened container and helps prevent leakage of liquids packaged in the unopened containers.

The commercial laminated cap liners that provide an inner container seal include a layer of pulpboard secured to an aluminum foil container sealing material with a microcrystalline wax. The exposed surface of the aluminum foil is provided with a heat-sealable adhesive coating that is tack-free at room temperature. In the usual commercial process, the unexposed surface of the pulpboard backing is permanently glued to the inner upper surface of a threaded cap or lid, that ultimately is mounted on the complimentarily threaded mouth of a filled container. The cap or lid then is passed through an induction heating unit, serving to rapidly heat the aluminum foil and simultaneously melt the microcrystalline wax and the heat-sealable adhesive coating. The heat-sealable adhesive coating then acts to adhere the container sealing material to the container. The melted microcrystalline wax is quickly absorbed by the porous pulpboard or paper backing, therefore greatly reducing the strength of bond between the pulpboard backing and the aluminum foil, such that when the cap or lid is removed from the container, the pulpboard backing remains secured to the inside of the cap or lid, while the aluminum foil remains firmly sealed to the mouth of the container. This well-known prior art cap liner is widely used because of its simplicity of application, and further details of this induction heating cap sealing process are set forth in considerable detail in Palmer U.S. Pat. No. 2,937,481.

As described above, prior to the present invention, the typical structure of a cap liner designed for use with induction heating cap sealing techniques includes a layer of pulpboard secured to a layer of aluminum foil by a layer of microcrystalline wax. The opposite face of the aluminum foil is provided with a heat-sealable adhesive coating that is compatible with the material of construction of the container. Caps or lids provided with such a laminated cap liner are torqued onto filled containers, and these containers then are passed through a high frequency induction heating unit. During the induction heating process, the aluminum foil usually reaches a temperature in the range of about 200° F. to about 325° F. causing the microcrystalline wax to melt and be absorbed by the pulpboard, and causing the container sealing material to be heat welded to the rim of the container by the heat-sealable adhesive coating.

Although resealable caps including the above-described liners are easy to apply to the container, the manufacturing process of the above-described prior art laminated cap liners is a complex process requiring sophisticated and expensive equipment, such as heating tanks, special pumps and special applicators in order to apply the microcrystalline wax adhesives to laminate the pulpboard backing, and a chilled rolling system in order to set the laminate. In addition to being cumbersome and expensive, this manufacturing process requires high energy consumptions and presents an operator hazard in handling melted microcrystalline waxes at temperatures of about 160° F. to about 180° F. Furthermore, the laminated cap liner resulting from this manufacturing process does not allow the cap and/or container to continue protecting the container contents from the effects of air and moisture and from leakage after the container sealing material is removed from the container by the consumer.

However, in accordance with the present invention, a water-based settable and/or crosslinkable adhesive composition is used to replace the microcrystalline wax in the production of laminated cap liners. As will be discussed more fully hereinafter, the water-based settable and/or crosslinkable adhesive composition affords the benefit of a simple and economic application to the pulpboard and the benefit of forming a leak-resistant polymeric film over the pulpboard backing upon crosslinking of a crosslinkable adhesive composition and/or upon setting of a non-crosslinking adhesive composition during the induction heating cap sealing process to release the container sealing material. In contrast, the microcrystalline wax utilized in the prior art laminated cap liners merely melts during the induction heating process and is absorbed by the relatively absorbent pulpboard backing to release the container sealing material. The absorptivity of the pulpboard is not effectively reduced by the absorbed microcrystalline wax. Therefore, after the container is opened and the protective inner container seal is removed, the prior art laminated cap liners are subject to leakage because the container contents can contact and can be absorbed by the pulpboard backing, thereby eventually deteriorating the pulpboard backing and leading to container leakage at the cap area. However, the water-based settable and/or crosslinkable adhesive compositions utilized in the present invention serve initially to secure the container sealing material to the pulpboard backing while the settable and/or crosslinkable adhesive composition is still tacky and essentially unset and/or uncrosslinked. Then, after setting and/or crosslinking initiated by the induction heating process, the water-based adhesive composition forms a chemically-resistant, liquid impermeable barrier coating over the pulpboard to prevent direct contact of the pulpboard with the contents of the container. By preventing direct contact between the container contents and the pulpboard, pulpboard disintegration and the resulting leakage of the contents at the cap area of the container is precluded.

As described above, the laminated cap liner structure of the present invention is an improved laminated cap liner wherein the microcrystalline wax used in the prior art to secure the container sealing material to the pulpboard backing is replaced by a crosslinkable adhesive composition. Other investigators have thoroughly studied the heat-sealable adhesive coatings that are applied to the face of the container sealing material that contacts the mouth of the container and act to bond the container sealing material to the mouth of the container. For example, Ou-Yang, in U.S. Pat. No. 4,503,123, discloses a blend of an acrylate polymer and a vinyl polymer to act as an adhesive to allow an aluminum foil container sealing material to bond to either glass or plastic containers. However, Ou-Yang, in accordance with the prior art, uses a microcrystalline wax to secure the aluminum foil container sealing material to the pulpboard backing. Furthermore, in direct contrast to the crosslinkable adhesive composition used in the present invention to secure the pulpboard or paper backing to the face the container sealing material opposite the face contacting the mouth of the container, the adhesives disclosed by Ou-Yang are tack free at room temperature, and upon induction heating, the resulting increase in temperature increases the tack of the heat-sealable adhesive to permit bonding of the aluminum foil container sealing material to the container. In accordance with the present invention and in contrast to the prior art, the settable and/or crosslinkable adhesive composition utilized to secure the pulpboard or paper backing to the container sealing material possesses sufficient tack before undergoing the induction heating process such that the aluminum foil container sealing material can releasably bond to the pulpboard backing, and, upon induction heating and the resulting increase in temperature, the settable and/or crosslinkable adhesive composition loses its tack to release the aluminum foil container sealing material and to form leak-resistant, liquid impermeable settable and/or crosslinked polymeric film over the pulpboard backing.

In addition, Hori et al in U.S. Pat. No. 4,199,646, discloses heat activated adhesives that increase in tack as the temperature is increased. When utilized as a pressure-sensitive adhesive, the adhesives disclosed by Hori substantially increase in tack as temperatures are elevated from ambient temperature to 60° C. to 100° C. The Hori et al patent is directed to adhesives that are substantially non-viscous at normal temperatures and have excellent bond strength at high temperatures. The settable and/or crosslinkable adhesive compositions utilized in the present invention similarly are non-viscous at normal temperature. However, in accordance with the present invention, the settable and/or crosslinkable adhesive compositions lose their bond strength (tackiness) at higher temperatures to form non-adhesive, chemically-resistant films.

The water-based settable and/or crosslinkable adhesive compositions used in the present invention exhibit a sufficient bond and tack at room, or ambient, temperature to bond the pulpboard or paper backing to the container sealing material. However, upon induction heating, wherein the temperature of the container sealing material can rise to from about 100° F. to about 425° F., the water-based settable and/or adhesive compositions set and/or crosslink to essentially lose all of their tack and produce a continuous polymeric film such that the container sealing material can be released from the pulpboard or paper backing for bonding to the container by a heat-sealable adhesive coating, such as those disclosed by Ou-Yang in U.S. Pat. No. 4,503,123. In contrast, induction heating of the container sealing material would not serve to set and/or crosslink the adhesives disclosed by Hori to form a non-adhesive film and therefore release the container sealing material. Conversely, the adhesives disclosed by Hori would maintain, or increase, their strong adhesive characteristics at the elevated temperatures achieved by the induction heating cap sealing process and not release the container sealing material. The net result would be a container sealing material bound both to the container and to the pulpboard backing, therefore making initial cap removal from the container difficult or impossible, reducing tamperproof effectiveness, and destroying any leakproof characteristics of the cap liner upon resealing of the container.

SUMMARY OF THE INVENTION

In brief, the present invention is directed to a laminated cap liner comprising a pulpboard or paper backing releasably secured to a container sealing material, such as aluminum foil, by a water-based settable and/or crosslinkable adhesive composition. The opposite face of the container sealing material is provided with a heat-sealable adhesive coating to achieve bonding of the container sealing material to the mouth of the container. The water-based settable and/or crosslinkable adhesive composition utilized in the present invention has sufficient tack at room temperature to secure the container sealing material to the pulpboard backing. However, upon undergoing an induction heating cap sealing process, wherein the container sealing material, such as aluminum foil, reaches temperatures of from about 100° F. to about 425° F., the settable and/or crosslinkable adhesive composition sets and/or undergoes a crosslinking reaction to form a non-tacky, liquid-impermeable polymeric film. As a result, the container sealing material is released from the pulpboard or paper backing and simultaneously is bound to the container by the heat-sealable adhesive coating that is present on the opposite face of the container sealing material. The set and/or crosslinked, liquid-impermeable polymeric film that formed over the pulpboard or paper backing further acts to make the cap liner, and therefore the cap area of the container, leak-resistant to the contents of the container after removal of the container sealing material from the mouth of the container.

Therefore, it is an object of the present invention to provide a laminated cap liner.

It is also an object of the present invention to provide a leak-resistant laminated cap liner.

Another object of the present invention is to provide a laminated cap liner that can secure a tamperproof container sealing material to a container by induction heating techniques.

Another object of the present invention is to provide a laminated cap liner comprising a pulpboard or paper backing and a container sealing material that are releasably secured by a water-based settable and/or crosslinkable adhesive composition.

Another object of the present invention is to provide a laminated cap liner including a water-based settable and/or crosslinkable adhesive composition that sets and/or crosslinks at temperatures attained under induction heating cap sealing techniques, and thereby lose its tackiness to release the container sealing material and to form a liquid-impermeable polymeric film.

Still another object of the present invention is to provide a laminated cap liner including a water-based settable and/or crosslinkable adhesive composition that forms a liquid-impermeable polymeric film at temperatures of about 100° F. to about 425° F.

Another object of the present invention is to provide a laminated cap liner having a liquid impervious polymeric film formed over the pulpboard or paper backing during an induction heating cap sealing process to help prevent leakage of the container contents from the cap area of the container.

Another object of the present invention is to provide a laminated cap liner including a settable and/or crosslinkable adhesive composition comprising a crosslinkable polymer, a crosslinking agent and a crosslinking catalyst and/or a non-crosslinkable settable polymer.

Another object of the present invention is to provide a laminated cap liner that is efficiently and economically produced.

BRIEF DESCRIPTION OF THE DRAWINGS

The above and other objects and advantages and novel features of the present invention will become apparent from the following description of the preferred embodiments of the invention in conjunction with the accompanying figures

DETAILED DESCRIPTION OF THE INVENTION

Using laminated cap liners in an induction heating cap sealing process to provide containers with tamperproof inner seals is well known. Therefore, in order to emphasize the specific nature of the present invention, it should be understood that the laminated cap liners described in the present invention are identical in structure to the laminated cap liners described in the prior art except for the adhesive used to releasably secure the container sealing material to pulpboard liner. Consequently, the present invention is not directed to heat-sealable adhesive coatings, such as the coatings disclosed by Ou-Yang in U.S. Pat. No. 4,503,123, that are applied to the face of the container sealing material opposite the pulpboard backing, and thus serve to secure the container sealing material to the container.

In accordance with an important feature of the present invention, a water-based settable and/or crosslinkable adhesive composition is used in place of the prior art microcrystalline wax to secure the container sealing material to the pulpboard or paper backing. As will be discussed more fully hereinafter, the use of the water-based settable and/or crosslinkable adhesive composition permits the more efficient production of laminated cap liners, and also affords the new and unexpected benefits of releasing the container sealing material from the pulpboard backing at any desired temperature of from approximately 100° F. to approximately 425° F., and of providing a chemically-resistant, liquid-impermeable set and/or crosslinked polymeric film over the pulpboard or paper backing to resist leakage at the cap area of the container after resealing.

Figure 1:
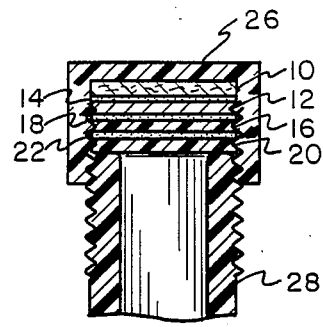
FIG. 1 is a cross-section view of a container cap and laminated cap liner in accordance with the present invention.
Figure 2:
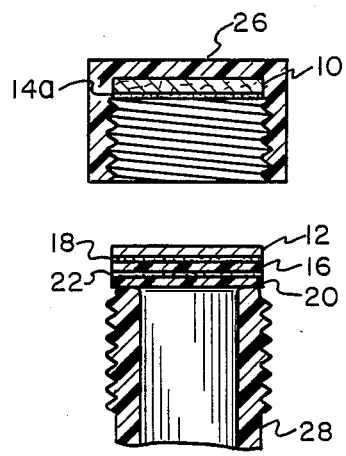
FIG. 2 is a cross-section view of the container cap and laminated cap liner of FIG. 1 after undergoing an induction heating cap sealing process and subsequent removal of the cap from the container.

In accordance with the present invention, FIG. 1 illustrates a vertical cross-section of a container cap, including a laminated cap liner, set on the mouth of a container and prior to undergoing an induction heating cap sealing process. For purposes of illustration only, the following particular dimensions of the various layers of the laminated cap liner are provided. The laminated cap liner comprises a 0.030–0.035 inch layer 10 of lined pulpboard. A 0.0003–0.001 inch layer of a container sealing material 12, such as aluminum foil, is secured to the pulpboard or paper layer 10 by a settable and/or crosslinkable adhesive composition 14. A 0.0005 inch layer of a suitable polyester 16 is secured by a first layer of conventional adhesive 18, such as a polyisocyanate, to the container sealing material 12 for support and strength. A 0.0015 inch layer of heat-sealable adhesive coating 20 is secured to the polyester layer 16 by a second layer of conventional adhesive 22. The heat-sealable adhesive coating 20 is comprised of a material that is compatible with the material of construction of container 28; for example, a polyvinyl chloride container requires a polyvinyl chloride-based heat-sealable adhesive coating.

In accordance with an important feature of the present invention, the water-based settable and/or crosslinkable adhesive composition 14 is a water-based emulsion comprising a crosslinkable polymer, a crosslinking agent and a crosslinking catalyst and/or a non-crosslinkable settable polymer. The settable and/or crosslinkable adhesive composition 14 is preferably a low viscosity liquid at room temperature in order to allow easy and efficient application of the settable and/or crosslinkable adhesive composition 14 to either the pulpboard or paper backing or to the container sealing material, depending upon the method of manufacture of the laminated cap liner. In the usual method, of the crosslinkable adhesive composition 14 is applied to the pulpboard or paper backing 10, followed by placement of the container sealing material 12 to contact the settable and/or crosslinkable adhesive composition 14. The container sealing material is usually an aluminum foil, however other container sealing materials, such as a tin foil, lead foil or any other metal that can be rolled down to a gauge of 0.001 in. or less, can be used in accordance with the present invention. The settable and/or crosslinkable adhesive composition 14, applied to the pulpboard or paper backing as a low viscosity liquid, dries by water evaporation and/or by water absorption into the pulpboard or paper backing therefore yielding an unset and/or uncrosslinked layer of settable and/or crosslinkable adhesive composition 14. Then, the tacky layer of settable and/or crosslinkable adhesive composition 14, when subjected to increased temperatures in the range of from about 100° F. to about 425° F., sets and/or crosslinks to form a high molecular weight, liquid-impervious film, and thereby lose its tack and adhesive properties. The pulp layer 10 and container sealing material 12 thus separate, or delaminate, and a chemically-resistant film, comprising the set and/or crosslinked adhesive composition 14, is formed over the surface of the pulp layer 10.

The settable and/or crosslinkable adhesive composition 14 of the present invention comprises a crosslinkable polymer, a crosslinking agent and a crosslinking catalyst and/or a non-crosslinkable settable polymer, such that setting and/or crosslinking of the settable and/or crosslinkable adhesive composition 14 occurs during the induction heating cap sealing process, wherein the settable and/or crosslinkable adhesive composition 14 attains temperatures of about 100° F. to about 425° F. due to the temperature increase of the container sealing material 12. In accordance with an important feature of the present invention, it is envisioned that the settable and/or crosslinkable adhesive composition 14 can be designed to set and/or crosslink, and therefore form a liquid-impervious, chemically-resistant polymeric film over the pulpboard or paper backing and thereby release the container sealing material 12, at a much lower range of temperatures than is possible for cap liners utilizing the prior art microcrystalline wax adhesive.

The prior art microcrystalline wax adhesive requires heating to approximately 230° F. before the wax melts and is absorbed by the pulpboard backing 10 to thereby release the container sealing material 12. In addition, because the microcrystalline wax is absorbed into the pulpboard backing 10, the benefit of leak-resistance to container contents after resealing is not provided because the pulpboard backing 10 essentially retains its absorptive properties. However, the laminated cap liner of the present invention can both provide a tamper evidence seal for adhesion to the mouth of a container and provide the added benefit of leak-resistance by forming a chemically-resistant, liquid-impermeable polymeric film over the pulpboard or paper backing 10 to essentially eliminate the absorptive properties of the pulpboard or paper. Additionally, the laminated cap liner of the present invention can provide these new and unexpected benefits by undergoing an induction heating cap sealing process that raises the temperature of the container sealing material 12 and the settable and/or crosslinkable adhesive composition 14 only up to temperatures as low as about 100° F. However, a settable and/or crosslinkable adhesive compositions 14 is available that will not set and/or crosslink until approximately 425° F. should such a high temperature induction heating cap sealing process be desired or required.

In accordance with an important feature of the present invention, the settable and/or crosslinkable adhesive composition includes a settable and/or crosslinkable homopolymer, terpolymer or copolymer. Generally, the crosslinkable polymers include chemical moieties capable of reacting with crosslinking agents in the present of a crosslinking catalyst, whereas the settable polymers are non-crosslinking polymers that set under the conditions encountered during the reduction heating process, such as by melting and/or flowing, to form a continuous liquid impervious polymeric film. Crosslinkable and/or settable polymers found useful in the practice of the present invention include, synthetic polymers and naturally occurring polymers, including but not limited to, casein, ethylene-vinyl chloride, ethylene-vinyl acetate, vinyl acetate-acrylate, polyvinyl acetate, polyvinyl alcohols, polyvinyl chlorides, vinyl acetate-ethylene, polyacrylics, vinyl acrylics, carboxylated styrene butadiene, epoxy resins, polyisocyanate resins and other like homopolymers, terpolymers and copolymers; or mixtures thereof. The polymers useful in the practice of the present invention normally are commercially available, and selection of a particular homopolymer, terpolymer or copolymer is limited only by the ability of the polymer to crosslink at the temperature desired and/or the temperature achieved during the induction heating cap sealing technique to provide a chemically-resistant, liquid-impermeable polymeric film over the pulpboard backing.

The settable and/or crosslinkable adhesive composition 14 also includes a crosslinking agent and a crosslinking catalyst to facilitate polymerization and/or increase crosslinking of the crosslinkable polymer included in the adhesive composition 14. If only a settable polymer is incorporated into the adhesive composition 14, the crosslinking agent and crosslinking catalyst can be omitted from the adhesive composition 14. Crosslinking agents found to be useful in the practice of the present invention include, but are not limited to, acrylic crosslinkers, such as methylenebisacrylamide and glycerol propoxytriacrylate; melamine-formaldehyde; urea-formaldehyde; high purity glycoxal; phenol-formaldehyde; trimethylol melamine; dimethylol ethylene urea; alpha-hydroxyadipaldehyde; and the chelating metal salts of copper and/or nickel; or mixtures thereof. Representative crosslinking catalysts that are added to control the speed of the reaction and to assure completion of the polymerization crosslinking reactions are exemplified by, but are not limited to, ammonium chloride, sodium bisulfate, citric acid and sulfonic acid; or mixtures thereof.

The settable and/or crosslinkable adhesive composition 14 is preferably an aqueous emulsion comprising from about 25% to about 55%, and preferably from about 35% to about 45% of the settable and/or crosslinkable polymer, based on the total weight of the settable and/or crosslinkable adhesive composition 14. If a crosslinkable polymer is included in the adhesive composition 14, the adhesive composition 14 also includes from about 8% to about 20%, and preferably from about 12% to about 15% of the crosslinking agent, based on the total weight of the crosslinkable adhesive composition 14; and from about 0.1% to about 5%, and preferably from about 0.5% to about 4% of the crosslinking catalyst, based on the total weight of the settable and/or crosslinkable adhesive composition 14. Although aqueous emulsions are preferred, nonaqueous solutions including the crosslinkable polymer, the crosslinking agent and the crosslinking catalyst and/or the non-crosslinkable settable polymer having a low viscosity and not adversely affecting the pulpboard or container sealing material are also envisioned.

The three essential ingredients provide a settable and/or crosslinkable adhesive composition having the desired setting or crosslinking temperature to provide a chemically-resistant, liquid impermeable polymeric film over the pulpboard or paper backing for leak-resistant resealing of the container after removal of the container sealing material. Furthermore, a variety of other additives such as surfactants, fillers, colorants, lubricants and other optional ingredients that do not adversely affect the ability of the settable and/or crosslinkable adhesive composition 14 to set and/or crosslink and form a non-adhesive, chemically-resistant, liquid-impermeable polymeric film, can be included to improve the flow of the emulsion and/or to achieve desired release temperature, ease of release, thickness, color and other physical and/or aesthetic characteristics of the liquid-impervious film produced after the settable and/or crosslinkable adhesive composition 14 is heated and set and/or crosslinked. Generally, any single optional ingredient included in the settable and/or crosslinkable adhesive composition is present in an amount of less than about 10%, by weight of the settable and/or crosslinkable adhesive composition; and the total amount of all optional ingredients included in the settable and/or crosslinkable adhesive composition generally is less than about 15% by weight of the settable and/or crosslinkable adhesive composition.

Example 1 demonstrates a settable and/or crosslinkable adhesive composition 14 that can be used in the laminated cap liner of the present invention.

Example 1

| Ingredient | % By Weight |
| --- | --- |
| Ethylene-vinyl acetate aqueous emulsion (50% solids) | 25% |
| Ethylene-vinyl chloride aqueous emulsion (50% solids) | 25% |
| Vinylacetate-ethylene aqueous emulsion (50% solids) | 28% |
| Melamine-formaldehyde crosslinking agent | 8% |
| Dimethyl ethylene urea crosslinking agent | 2% |
| Ammonium chloride catalyst (25% aqueous solution) | 3% |
| Dihexyl Phthalate | 2% |
| Inert filler and/or colorant | 4% |
| Wax aqueous emulsion (melting point 160–190° F.) (50% solids) | 3% |
| Total | 100% |

The dihexyl phthalate, or butyl benzyl phthalate, is added to the settable and/or crosslinkable adhesive composition 14 as a plasticizer. The inert filler, such as a low to nonabsorbent silicate or aluminate is optionally added as a colorant. In addition, the wax emulsion serves as a release agent.

In accordance with another important feature of the present invention, the water-based settable and/or crosslinkable adhesive composition 14 permits lamination of the pulpboard or paper backing and the container sealing material at room temperature. Therefore, the need for complex heating and cooling equipment, as is required when using the prior art microcrystalline wax, is eliminated. For example, in manufacturing methods utilizing the prior art microcrystalline wax, the aluminum foil container sealing material is roll coated with molten (230° F.) microcrystalline wax, then cooled, and followed by contacting the pulpboard sheet and passing through squeeze rolls at 130° F. However, in accordance with an important feature of the present invention, the settable and/or crosslinkable adhesive composition 14 avoids the need to employ such expensive and time-consuming heating and cooling cycles.

In forming the laminated cap liner of the present invention, the components of the settable and/or crosslinkable adhesive composition 14 listed in Example 1 are combined, then thoroughly mixed. During mixing, the settable and/or crosslinkable adhesive composition 14 is deaerated to eliminate frothing interference in regard to viscosity control and film continuity. The adhesive composition 14 is applied to one face of the container sealing material 12 at room temperature. A sufficient amount of the water-based settable and/or crosslinkable adhesive composition 14 is applied to the container sealing material such that, after drying, the settable and/or crosslinkable adhesive composition 14 is from about 0.0005 in. to about 0.010 in. thick; or from about 5 lb. to about 8 lb. of the adhesive composition 14 is applied to 1000 square feet of the container sealing material 12. The water-based settable and/or crosslinkable adhesive composition 14 can be applied by any coating device, such as a roll coater, a reverse roll coater, a Meyer rod coater; by spraying; or by similar well known application techniques. The coated face of the container sealing material 12 then is contacted with the pulp layer 10 with sufficient pressure to form the laminated cap liner. The laminated cap liner is allowed to stand overnight. The laminated cap liner then is slit into the desired width for shipment to cap manufacturers.

The laminated cap liner of the present invention is produced from laminated sheets produced as described above by die cutting the laminated sheets into discs and mounting the laminated discs inside the cap 26. The lined cap then is torqued onto the container 28. The capped containers are passed through a high frequency induction heating unit that excites the container sealing material layer 12 such that the temperature of the container sealing material increases to from approximately 100° F. to approximately 425° F., and usually to a temperature of from about 200° F. to about 325° F. At this elevated temperature, the settable and/or crosslinkable adhesive composition 14 sets and/or crosslinks to lose its tackiness and adhesive properties and form a polymeric film 14a over the surface of the pulpboard or paper backing 10. Further, the heat-sealable adhesive coating 20 becomes heat welded to the rim of the container 28 and remains secured to the container sealing material 12.

Figure 3:
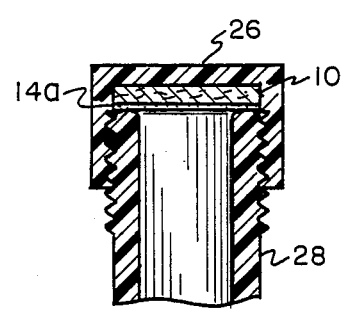
FIG. 3 is a cross-section view of the cap and laminated cap liner after removal of the container sealing material from the container and replacement of the cap.

When the cap 26 is removed from the container 28, the pulpboard backing 10 and the chemically-resistant, liquid-impermeable polymeric film 14a remains with the cap 26. The container sealing material 12/polyester 16/heat-sealable adhesive coating 20 inner sealing structure remains on the container 28 to inner seal the container and to provide tamper evidence. After the inner seal is removed by the consumer during use of the container, the cap 26 can be replaced on the container 28 and the film 14a provides an effective seal against the rim of the container 28, as illustrated in FIG. 3, to resist leakage from the container and to prevent air and moisture entry into the container.

From the foregoing detailed description it is seen that the laminated cap liner of the present invention provides a new and improved resealable laminated cap liner. Obviously, many modifications and variations of the invention as hereinbefore set forth can be made without departing from the spirit and scope thereof and therefore only such limitations should be imposed as are indicated by the appended claims.

What is claimed and desired to be secured by Letters Patent of the United States is:

1. An improved laminated cap liner of the type formed of a layer of pulp, a layer of metal foil container sealing material adhesively affixed to one surface of said layer of pulp, and a layer of adhesive disposed between said layer of pulp and said layer of metal foil container sealing material, the improvement comprising:

the adhesive securing said layer of pulp to said layer of metal foil container sealing material is a water base emulsion including an essentially non-crosslinked, crosslinkable polymer, a crosslinking agent and a catalyst and/or an essentially non-crosslinkable settable polymer such that upon heating of said layer of metal foil container sealing material to a temperature sufficient to crosslink said crosslinkable polymer with said crosslinking agent and/or to set said settable polymer to form a nonadhesive, chemically resistant film over said layer of pulp such that when the cap is removed from the metal foil container, the layer of pulp will separate from said layer of container sealing material.

2. The laminated cap liner of claim 1, wherein the adhesive securing said layer of pulp to said layer of metal foil container sealing material is an aqueous emulsion including from about 25% to about 55% by weight crosslinkable polymer; from about 8% to about 20% by weight crosslinking agent; and from about 0.1% to about 5% by weight crosslinking catalyst.

3. The laminated cap liner of claim 1, wherein the adhesive securing said layer of pulp to said layer of metal foil container sealing material is an aqueous emulsion including from about 25% to about 55% by weight non-crosslinkable settable polymer.

4. The laminated cap liner of claim 1, wherein the adhesive securing said layer of pulp to said layer of metal foil container sealing material is an aqueous emulsion including from about 35% to about 40% by weight crosslinkable polymer; from about 12% to about 15% by weight crosslinking agent; and from about 0.5% to about 4% by weight crosslinking catalyst.

5. The laminated cap liner of claim 1, wherein the adhesive securing said layer of pulp to said layer of metal foil container sealing material is an aqueous emulsion including from about 35% to about 40% by weight non-crosslinkable settable polymer.

6. The laminated cap liner of claim 1, wherein the adhesive securing said layer of pulp to said layer of metal foil container sealing material is an aqueous emulsion including a crosslinkable polymer and/or a non-crosslinkable settable polymer, wherein the total amount of the crosslinkable polymer and/or non-crosslinkable settable polymer present in the adhesive is in the range of about 25% by weight to about 55% by weight of the aqueous emulsion; and, if a crosslinkable polymer is present in the aqueous emulsion, from about 8% to about 20% by weight crosslinking agent and from about 0.1% to about 5% by weight crosslinking catalyst, based on the total weigh of the aqueous emulsion.

7. The laminated cap liner of claim 1, wherein the adhesive securing said layer of pulp to said layer of metal foil container sealing material is an aqueous emulsion including a crosslinkable polymer and/or a non-crosslinkable settable polymer, wherein the total amount of the crosslinkable polymer and/or non-crosslinkable settable polymer present in the adhesive is in the range of about 35% by weight to about 40% by weight of the aqueous emulsion; and, if a crosslinkable polymer is present in the aqueous emulsion, from about 12% to about 15% by weight crosslinking agent and from about 0.5% to about 4% by weight crosslinking catalyst, based on the total weight of the aqueous emulsion.

8. The laminated cap liner of claim 1, wherein the crosslinkable polymer and/or the non-crosslinkable settable polymer is selected from the group consisting of casein, ethylene-vinyl chloride, ethylene-vinyl acetate, vinyl acetate-acrylate, polyvinyl acetate, polyvinyl alcohol, polyvinyl chloride, vinyl acetate-ethylene, acrylics, vinyl acrylic, carboxylated styrene butadiene, epoxy resins and polyisocyanate resins; or combinations thereof.

9. The laminated cap liner of claim 1, wherein the crosslinkable polymer and/or non-crosslinkable settable polymer is selected from the group consisting of ethylene-vinyl chloride, ethylene-vinyl acetate, polyvinyl chloride, acrylic and vinyl acrylic; or combinations thereof.

10. The laminated cap liner of claim 1, wherein the crosslinking agent is selected from the group consisting of acrylic, melamine-formaldehyde, urea-formaldehyde, glycoxal, phenol-formaldehyde, trimethylol melamine, dimethylol ethylene urea, alpha-hydroxy adipaldehyde, chelating metal salts of copper and chelating metal salts of nickel; or combinations thereof.

11. The laminated cap liner of claim 1, wherein the catalyst is selected from the group consisting of ammonium chloride, sodium bisulfate, citric acid and sulfonic acid; or combinations thereof.

12. The laminated cap liner of claim 1, wherein the metal foil container sealing material is heated to a temperature of about 100° F. to about 425° F.

13. The laminated cap liner of claim 1, wherein the metal foil container sealing material is aluminum foil.

14. The laminated cap liner of claim 13, wherein the aluminum foil is heated to a temperature of about 200° F. to about 325° F.

15. A method of preventing leakage from a container comprising forming a cap liner in a cap including a layer of pulp, a layer of metal foil container sealing material affixed to one surface of the layer of pulp by a first adhesive, and a layer of a second adhesive secured to the layer of metal foil container sealing material opposite the layer of pulp;

securing said cap to said container;

heating said first adhesive in an amount sufficient to set and/or crosslink said first adhesive, said metal foil container sealing material is no longer adhesively bound to said pulp, and said first adhesive is in the form of a non-adhesive, chemically resistant film to prevent leakage from said container after removing said metal foil container sealing material from said container and recapping said container with said cap.

16. The method of claim 15, wherein the first adhesive comprises a water-base emulsion including a crosslinkable polymer, a crosslinking agent and a catalyst and/or a non-crosslinkable settable polymer.

17. The method of claim 16, wherein the first adhesive comprises an aqueous emulsion including from about 25% to about 55% by weight crosslinkable polymer; from about 8% to about 20% by weight crosslinking agent; and from about 0.1% to about 5% by weight crosslinking catalyst.

18. The method of claim 16, wherein the first adhesive comprises an aqueous emulsion including from about 25% to about 55% by weight crosslinkable polymer; from about 8% to about 20% by weight non-crosslinkable settable polymer.

19. The method of claim 16, wherein the first adhesive comprises an aqueous emulsion including from about 35% to about 40% by weight crosslinkable polymer; from about 12% to about 15% by weight crosslinking agent; and from about 0.5% to about 4% by weight crosslinking catalyst.

20. The method of claim 16, wherein the first adhesive comprises an aqueous emulsion including from about 35% to about 40% by weight non-crosslinkable settable polymer.

21. The method of claim 16, wherein the first adhesive comprises an aqueous emulsion including a crosslinkable polymer and/or a non-crosslinkable settable polymer, wherein the total amount of the crosslinkable polymer and/or non-crosslinkable settable polymer present in the adhesive is in the range of about 25% by weight to about 55% by weight of the aqueous emulsion; and, if a crosslinkable polymer is present in the aqueous emulsion, from about 8% to about 20% by weight crosslinking agent and from about 0.1% to about 5% by weight crosslinking catalyst, based on the total weight of the aqueous emulsion.

22. The method of claim 16, wherein the adhesive securing said layer of pulp to said layer of metal foil container sealing material is an aqueous emulsion including a crosslinkable polymer and/or a non-crosslinkable settable polymer, wherein the total amount of the crosslinkable polymer and/or non-crosslinkable settable polymer present in the adhesive is in the range of about 35% by weight to about 40% by weight of the aqueous emulsion; and, if a crosslinkable polymer is present in the aqueous emulsion, from about 12% to about 15% by weight crosslinking agent and from about 0.5% to about 4% by weight crosslinking agent, based on the total weight of the aqueous emulsion.

23. The method of claim 16, wherein the crosslinkable polymer and/or the non-crosslinkable settable polymer is selected from the group consisting of casein, ethylene-vinyl chloride, ethylene-vinyl acetate, vinyl acetate-acrylate, polyvinyl acetate, polyvinyl chloride, polyvinyl alcohol, vinyl acetate-ethylene, acrylics, vinyl acrylic, carboxylated styrene butadiene, epoxy resins and polyisocyanate resins; or combinations thereof.

24. The method of claim 16, wherein the crosslinkable polymer and/or the non-crosslinkable settable polymer is selected from the group consisting of ethylene-vinyl chloride, ethylene-vinyl acetate, acrylic and vinyl acrylic; or combinations thereof.

25. The method of claim 16, wherein the crosslinking agent is selected from the group consisting of acrylic, melamine-formaldehyde, urea-formaldehyde, glycoxal, phenol-formaldehyde, trimethylol melamine, dimethylol ethylene urea, alpha-hydroxy adipaldehyde, chelating metal salts of copper and chelating metal salts of nickel; or combinations thereof.

26. The method of claim 16, wherein the catalyst is selected from the group consisting of ammonium chloride, sodium bisulfate, citric acid and sulfonic acid; or combinations thereof.

27. The method of claim 15, wherein the metal foil container sealing material is heated to a temperature of about 100° F. to about 425° F.

28. The method of claim 15, wherein the metal foil container sealing material is aluminum foil.

29. The method of claim 28, wherein the aluminum foil is heated to a temperature of about 200° F. to about 325° F.

* * * * *